(12) United States Patent
Moore et al.

(10) Patent No.: US 11,381,399 B2
(45) Date of Patent: Jul. 5, 2022

(54) ENHANCED VEHICLE OPERATION (71) Applicants: Ford Global Technologies, LLC, Dearborn, MI (US); THE REGENTS OF THE UNIVERSITY OF MICHIGAN, Ann Arbor, MI (US)

(72) Inventors: John Moore, Canton, MI (US); Francis Obiagwu, Warren, MI (US); Hafiz Malik, Canton, MI (US)

(73) Assignees: Ford Global Technologies, LLC, Dearborn, MI (US); The Regents Of The University Of Michigan, Ann Arbor, MI (US)

( * ) Notice: Subject to any disclaimer, the term of this patent is extended or adjusted under 35 U.S.C. 154(b) by 149 days.

(21) Appl. No.: 16/837,011

(22) Filed: Apr. 1, 2020

(65) Prior Publication Data
US 2021/0314159 A1 Oct. 7, 2021

(51) Int. Cl.
*H04L 9/32* (2006.01)
*H04L 9/08* (2006.01)

(52) U.S. Cl.
CPC .......... *H04L 9/3226* (2013.01); *H04L 9/0869* (2013.01); *H04L 9/0872* (2013.01)

(58) Field of Classification Search
CPC ... H04L 9/3226; H04L 9/0872; H04L 9/0869; H04L 2209/608; H04L 2209/84; H04L 9/0894; H04L 9/32; G06T 2201/0051; G06T 1/0021; G06F 21/16; G06F 21/629; H04N 19/467
See application file for complete search history.

(56) References Cited

U.S. PATENT DOCUMENTS

| | | | |
|---|---|---|---|
| 6,519,350 B1 * | 2/2003 | Van Overveld | G06T 1/0021 382/100 |
| 7,409,556 B2 | 8/2008 | Wu et al. | |
| 8,379,911 B2 | 2/2013 | Vashistha et al. | |
| 2004/0071311 A1 * | 4/2004 | Choi | G06T 1/0071 382/100 |
| 2004/0136528 A1 * | 7/2004 | Muratani | G06T 1/005 380/37 |
| 2005/0169496 A1 * | 8/2005 | Perry | G06F 21/79 382/100 |
| 2007/0067079 A1 * | 3/2007 | Kosugi | G07C 5/085 701/32.4 |
| 2009/0141931 A1 * | 6/2009 | Yadid-Pecht | G06T 1/0035 382/100 |
| 2009/0310817 A1 * | 12/2009 | Park | H04N 5/913 382/100 |

(Continued)

FOREIGN PATENT DOCUMENTS

| | | |
|---|---|---|
| CN | 109064381 A | 12/2018 |
| KR | 20010075944 A | 8/2001 |

*Primary Examiner* — Matthew Smithers
(74) *Attorney, Agent, or Firm* — Brandon Hicks; Bejin Bieneman PLC (57) ABSTRACT

A computer includes a processor and a memory, the memory storing instructions executable by the processor to collect a digital image that includes a plurality of pixels with a first sensor, input a reference data string, a key data string, and a set of collected data from a second sensor into a permutation generator that outputs a watermark data string, and embed the watermark data string in the digital image at specified pixels in the plurality of pixels.

20 Claims, 4 Drawing Sheets

(56) References Cited

U.S. PATENT DOCUMENTS

| | | | |
|---|---|---|---|
| 2014/0016817 A1* | 1/2014 | Nakagata | G06T 1/005 |
| | | | 382/100 |
| 2016/0021435 A1* | 1/2016 | Topchy | G08C 23/02 |
| | | | 340/870.3 |
| 2016/0323741 A1* | 11/2016 | Lee | G06F 21/44 |
| 2018/0267558 A1* | 9/2018 | Tiwari | H04N 13/254 |
| 2018/0285537 A1 | 10/2018 | Wachtfogel et al. | |
| 2019/0236745 A1* | 8/2019 | Kulkarni | H04L 9/3226 |
| 2020/0050894 A1* | 2/2020 | Park | H04W 4/33 |
| 2020/0284883 A1* | 9/2020 | Ferreira | G01S 7/4816 |

\* cited by examiner

ENHANCED VEHICLE OPERATION

BACKGROUND

Vehicles can be equipped with computers, networks, sensors and controllers to acquire data regarding the vehicle's environment and/or to operate vehicle components. Vehicle sensors can provide data about a vehicle's environment, e.g., concerning routes to be traveled and objects in the vehicle's environment to be avoided.

DETAILED DESCRIPTION

A system includes a computer including a processor and a memory, wherein the memory stores instructions executable by the processor to receive from a first sensor a digital image that includes a plurality of pixels, input a reference data string, a key data string, and a set of collected data from a second sensor into a permutation generator that outputs a watermark data string, and embed the watermark data string in the digital image at specified pixels in the plurality of pixels.

The system can further include a second computer including a second processor and a second memory, the second memory storing instructions executable by the second processor to receive the digital image from the first sensor, compare pixels in the plurality of pixels in the digital image to a validation watermark data string generated from the reference data string, the key data string, and the set of collected data received from the second sensor, and upon determining that a number of pixels that include the validation watermark data string exceeds a threshold, validate the digital image.

The instructions stored by the memory can further include instructions to actuate one or more components of a machine based on the validated digital image.

The second memory can further include a same reference data string and a same key data string as the memory.

The second memory can further include instructions to receive a same set of collected data from the second sensor and to generate the validation watermark data string by adjusting bits of the reference data string based on the key data string and the set of collected data.

The set of collected data can be a set of geo-coordinates and a timestamp of collection of the set of geo-coordinates and the memory can further include instructions to apply an exclusive-or (XOR) function to the set of geo-coordinates and the timestamp to generate an exclusive disjunction data string.

The memory can further include instructions to encode the reference data string with the key data string to generate an encoded data string and to apply the XOR function to the exclusive disjunction data string and the encoded data string to generate the watermark data string.

The system can further include a second computer including a second processor and a second memory, the second memory storing instructions executable by the second processor to compare the set of geo-coordinates to a position of a vehicle at the timestamp and to validate the digital image when the set of geo-coordinates is within a distance threshold of the position of the vehicle and a number of pixels that include the watermark data string exceeds a threshold.

The memory can further include instructions to input the reference data string and the key data string to a cryptographic program to encode the reference data string and the key data string.

The memory can further include instructions to collect a second digital image, to generate a second watermark data string based on a second set of collected data, and to embed the second watermark data string at a second plurality of pixels.

The memory can further include instructions to collect a plurality of digital images and to generate a respective watermark data string for each digital image, each watermark data string being different than each other watermark data string.

The memory can further include instructions to assign a first portion of the watermark data string to a first pixel of the digital image associated with a first index and to assign successive portions of the watermark data string to successive pixels of the digital image associated with successive indexes.

The memory can further include instructions to identify the plurality of specified pixels with a random number generator seeded with a predetermined index key data string.

A method includes receiving from a first sensor a digital image that includes a plurality of pixels, inputting a reference data string, a key data string, and a set of collected data from a second sensor into a permutation generator that outputs a watermark data string, and embedding the watermark data string in the digital image at specified pixels in the plurality of pixels.

The method can further include receiving the digital image from the first sensor, comparing pixels in the plurality of pixels in the digital image to a validation watermark data string generated from the reference data string, the key data string, and the set of collected data received from the second sensor, and upon determining that a number of pixels that include the validation watermark data string exceeds a threshold, validating the digital image.

The method can further include actuating one or more components of a machine based on the validated digital image.

The method can further include receiving a same set of collected data from the second sensor and generating the validation watermark data string by adjusting bits of the reference data string based on the key data string and the set of collected data.

The set of collected data can be a set of geo-coordinates and a timestamp of collection of the set of geo-coordinates and the method can further include applying an exclusive-or (XOR) function to the set of geo-coordinates and the timestamp to generate an exclusive disjunction data string.

The method can further include encoding the reference data string with the key data string to generate an encoded data string and applying the XOR function to the exclusive disjunction data string and the encoded data string to generate the watermark data string.

The method can further include comparing the set of geo-coordinates to a position of a vehicle at the timestamp and validating the digital image when the set of geo-coordinates is within a distance threshold of the position of the vehicle and a number of pixels that include the watermark data string exceeds a threshold.

The method can further include inputting the reference data string and the key data string to a cryptographic program to encode the reference data string and the key data string.

The method can further include collecting a second digital image, generating a second watermark data string based on a second set of collected data, and embedding the second watermark data string at a second plurality of pixels.

The method can further include collecting a plurality of digital images and generating a respective watermark data string for each digital image, each watermark data string being different than each other watermark data string.

The method can further include assigning a first portion of the watermark data string to a first pixel of the digital image associated with a first index and assigning successive portions of the watermark data string to successive pixels of the digital image associated with successive indexes.

The method can further include identifying the plurality of specified pixels with a random number generator seeded with a predetermined index key data string.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Autonomous and semi-autonomous vehicles rely on inputs from various sensors to navigate and make real-time decisions without human intervention. The sensors transmit data representing the surrounding environment to various vehicle control modules. The data is used to help determine a path and/or actions taken by the autonomous vehicle. This means that the integrity of the communications between the sensors and the receiving modules should be maximized. Otherwise, the receiving module risks acting on spoofed data, which is data injected into a vehicle communications network channel by an unauthorized source (i.e., a source other than one of the vehicle sensors or other authorized vehicle components).

For example, during certain autonomous vehicle operations, images captured by a camera are passed to a computer. Based on the image, the computer can generate control signals to vehicle components that carry out autonomous vehicle operations. Difficulties can arise, however, if the images provided to the computer are not authentic. An example of inauthentic images (also referred to as "false images") may include images presented to the computer via an injection attack. An injection attack occurs when false images (i.e., images containing objects different from the objects detected by the camera) are maliciously uploaded to the autonomous vehicle.

As disclosed herein, a digital watermark can be employed to limit the likelihood that the autonomous vehicle will act upon false images. In this context, a digital watermark (or simply "watermark") is a data string that indicates validity of a set of data in which the data string is included. The data string can be identified by a computing device. Some watermarking techniques, such as watermarking techniques that embed a same watermark into every watermarked copy of a data segment, may be vulnerable to attacks by an outside attacker. In such attacks, the attacker has the knowledge of the watermark embedding algorithm and can estimate the embedded watermark using a sample of watermarked data. The attacker can embed the watermark onto fake data (i.e., false images) and inject the false images into the communication channel between the sensor and the receiving module. Because the false images include the expected watermark, the receiving module may incorrectly recognize the false image as an accurate image, resulting in the receiving module relying on compromised data.

One way to reduce the likelihood that an autonomous vehicle will operate according to false images is with an image watermarking system and method as disclosed herein; the system and method can be implemented by one or more vehicle computers, a vehicle system, or a combination of both.

The watermarking described herein can include generating a watermark using a secret seeded key that is shared during a cryptographic handshake at vehicle startup or during pre-trip operations. With the secret key, the watermarking system injects a randomly generated value into one or more randomly chosen pixel locations. The secret key may include a random index key data string and a key data string, discussed below. In addition, for each embedding instance, a set of randomly selected data indices may be used to select sensor data samples for watermark embedding. Therefore, each watermarked data segment carries a different watermark embedded at randomly selected different locations. This implementation is resistant to the attack discussed above because, for each watermark data segment, a different watermark is embedded at a different location.

Figure 1:
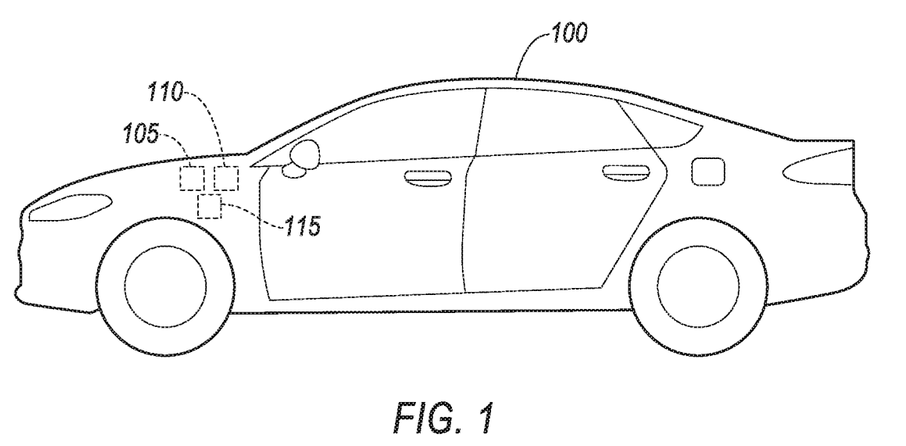
FIG. 1 is a diagram of a vehicle.
Figure 2:
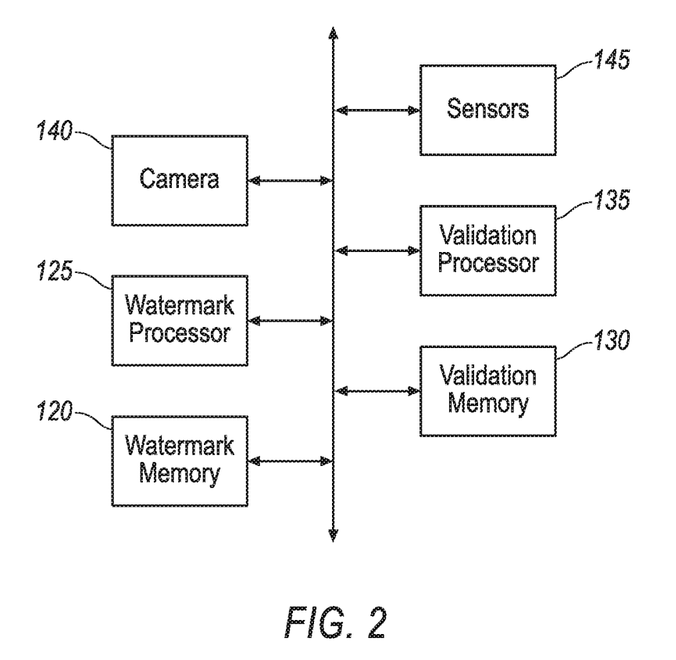
FIG. 2 is a diagram of an image watermarking system.

As illustrated in FIGS. 1 and 2, an autonomous vehicle 100 includes a computer 105, an components 110, and an image watermarking system 115 implemented via one or more vehicle computers collectively having a first memory 120, a first processor 125, a second memory 130, and a second processor 135. Although illustrated as a sedan, the vehicle 100 may include any passenger or commercial automobile such as a car, a truck, a sport utility vehicle, a crossover vehicle, a van, a minivan, a taxi, a bus, etc.

The computer 105 is generally programmed for communications on a host vehicle 101 network, e.g., including a conventional vehicle 100 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 100), the computer 105 may transmit messages to various devices in a vehicle 100 and/or receive messages from the various devices, e.g., controllers, actuators, sensors, etc., including sensors 145. Alternatively or additionally, in cases where the computer 105 actually comprises multiple devices, the host vehicle network may be used for communications between devices represented as the computer 105 in this disclosure. In addition, the computer 105 may be programmed for communicating with a network, which may include various wired and/or wireless networking technologies, e.g., cellular, Bluetooth®, Bluetooth® Low Energy (BLE), wired and/or wireless packet networks, etc.

For purposes of this disclosure, the term "autonomous vehicle" is used to refer to a vehicle 100 operating in a fully autonomous mode. A fully autonomous mode is defined as one in which each of vehicle 100 propulsion (typically via a powertrain including an electric motor and/or internal combustion engine), braking, and steering are controlled by the computer 105. A semi-autonomous mode is one in which at least one of vehicle 100 propulsion (typically via a powertrain including an electric motor and/or internal combustion engine), braking, and steering are controlled at least partly by the computer 105 as opposed to a human operator.

In a non-autonomous mode, i.e., a manual mode, the vehicle 100 propulsion, braking, and steering are controlled by the human operator.

The host vehicle 101 can include a plurality of vehicle components 110. In this context, each vehicle component 110 includes one or more hardware components adapted to perform a mechanical function or operation—such as moving the vehicle 100, slowing or stopping the vehicle 100, steering the host vehicle 100, etc. Non-limiting examples of components 110 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

The image watermarking system 115 shown in FIG. 1 includes a first memory 120, a first processor 125, a second memory 130, and a second processor 135 as shown in FIG. 2. When applied to an image, a watermark may have two or more characteristics including a watermark data string and a set of pixel to which at least a portion of the watermark data string is embedded in respective metadata of the pixels, as described below. As discussed in greater detail below, both the watermark data string and the pixel locations may be randomly (or pseudo-randomly) determined, and the first processor 125 and the second processor 135 may independently determine both the watermark data string and pixel locations based on a secret key shared during a cryptographic handshake.

The first memory 120 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The first memory 120 may store instructions executable by the first processor 125 and data such as images captured by the camera 140, the secret key used to generate the watermark data string, etc. The instructions and data stored in the first memory 120 may be accessible to the first processor 125, and at least some of the data may be made available to other components of the image watermarking system 115, the vehicle 100, or both.

The first processor 125 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The first processor 125 may also include other electronic components such as electronic control modules (ECUs) or the like, as well as one or more dedicated electronic circuits, i.e., hardware such as a Field-Programmable Gate Array (FPGA), Application-Specific Integrated Circuit (ASIC), System-On-Chip (SOC), etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be programmed based on VHDL programming, e.g. stored in a memory electrically connected to the FPGA circuit. In some examples, a combination of processor(s), ASIC(s), and/or FPGA circuits may be included inside a chip packaging.

The first processor 125 is programmed to process the images from the camera 140 to insert a watermark data string into the images and output a watermarked image (i.e., an image containing the watermark), as described below. The first processor 125 can be programmed to select random pixel locations and embed the watermark data string into the image at the random pixel locations. The watermark data string and the random pixel locations may be functions of a secret key shared between the first processor 125 and the second processor 135 at, e.g., startup of the vehicle 100, while the vehicle 100 is traveling, etc. In some instances, the secret key can be shared at startup of the vehicle 100 and then changed at various intervals, including random intervals, during operation of the vehicle 100. Further, the first processor 125 may be incorporated into another component of the vehicle 100. For example, the first processor 125 may be incorporated into the camera 140, the computer 105, etc.

The second memory 130 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The second memory 130 may store instructions executable by the second processor 135 and data such as watermarked images, the secret key used to generate the watermark, etc. The instructions and data stored in the second memory 130 may be accessible to the second processor 135, and at least some of the data may be made available to other components of the image watermarking system 115, the vehicle 100, or both.

The second processor 135 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The second processor 135 may also include other electronic components such as electronic control modules (ECUs) or the like, as well as one or more dedicated electronic circuits, i.e., hardware such as a Field-Programmable Gate Array (FPGA), Application-Specific Integrated Circuit (ASIC), System-On-Chip (SOC), etc., as described above.

The second processor 135 is programmed to receive one or more watermarked images (i.e., images containing the watermark added by the first processor 125), extract the watermark (e.g., identify the random pixel locations and watermark based on the secret key shared with the first processor 125 during the handshake procedure), and "validate," i.e., authenticate, the images based on the presence of the expected watermark at the expected pixel locations based on the secret key. Upon authenticating the validity of one of the images, the second processor 135 may be programmed to output a signal to the computer 105 approving the watermarked image. In response, the computer 105 can output signals to the components 110 to initiate various autonomous vehicle operations based on the images captured by the camera 140. If the second processor 135 determines that the watermark does not appear at the expected pixel locations or that the pixel does not have the expected data in the watermark data string, the second processor 135 may be programmed to output a signal to the computer 105, to one or more of the components 110, or both, identifying the image as a false image. As a result, the computer 105, the components 110, or both, may ignore the false image, set a flag indicating a possible attack, and/or take another remedial action to reduce the effect of the false image. Further, the second processor 135 may be incorporated into another component 110 of the vehicle 100, and the vehicle 100 may include any number of second processors 135. For example, the second processor 135 may be incorporated into the computer 105. Alternatively or additionally, a different second processor 135 may be incorporated into each of the controllers of the components 110.

In the context of this document, a statement that first processor 125 and/or the second processor 135 is programmed to execute an instruction or function can mean that a general purpose computer or ECU (i.e., including a general purpose CPU) is programmed to execute program instructions. Additionally or alternatively, the first processor 125 and/or the second processor 135 being programmed to execute an instruction or function can mean that an electronic circuit performs an operation specified based on a hardware description language programming such as VHDL, as discussed above. Further, the first processor 125 and/or the second processor 135 can be programmed to execute a series or set or steps where a first step or steps are executed by a first computer or electronic circuit and a second step or steps are executed by a second computer or electronic circuit. The first processor 125 and/or the second processor 135 can be programmed to actuate one or more components of a machine (e.g., the vehicle 100) based on the validated image.

The camera 140 is an optical sensor, i.e., can acquire images. The camera 140 may capture images of an area around the vehicle 100, including an area ahead of the vehicle 100, behind the vehicle 100, or next to the vehicle 100. To capture such images, the camera 140 may include a lens that projects light toward, e.g., a CCD image sensor, a CMOS image sensor, etc. The camera 140 processes the light and generates the image. The image may be output to the first processor 125 and, as discussed in greater detail below, can be used by the computer 105 to carry out operations of the vehicle 100. The first processor 125 may apply the watermark at a set of random pixel locations and with a random value prior to outputting the first processor 125 to the computer 105. Further, although discussed in the context of images captured by the camera 140, the watermarking system may similarly apply watermark data strings to the outputs of the other sensors of the computer 105.

The vehicle 100 includes one or more additional sensors 145. Sensors 145 can include a variety of devices. For example, various controllers may operate as sensors 145 to provide data via the vehicle 100 network or bus, e.g., data relating to vehicle speed, acceleration, position, subsystem and/or component status, etc. Further, other sensors 145 could include cameras, motion detectors, etc., i.e., sensors 145 to provide data for evaluating a position of a component, evaluating a slope of a roadway, etc. The sensors 145 could, without limitation, also include short range radar, long range radar, LIDAR, and/or ultrasonic transducers.

Collected data can include a variety of data collected in a vehicle 100. Examples of collected data are provided above, and moreover, data are generally collected using one or more sensors 145, and may additionally include data calculated therefrom in the computer 105. In general, collected data may include any data that may be gathered by the sensors 145 and/or computed from such data.

Figure 3:
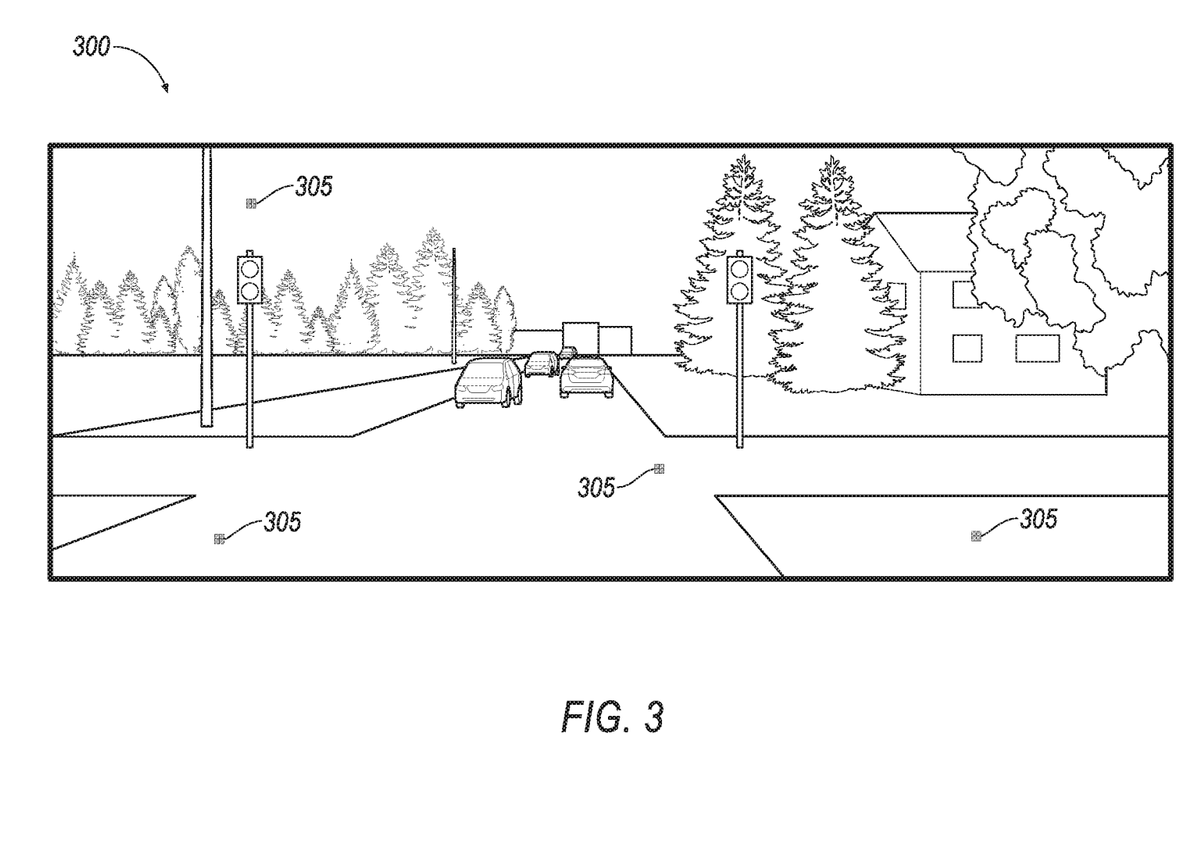
FIG. 3 is an example image collected by a camera mounted to the vehicle.

FIG. 3 is an example image 300 into which a watermark can be embedded. The image 300 is collected by the camera 140. The image 300 includes a plurality of pixels 305 into which the first processor 125 embeds the watermark. In the example of FIG. 3, select pixels 305 are shaded to represent pixels 305 into which the first processor 125 embeds the watermark, as described below. That is, the first processor 125 can write all bits of the watermark data string in the metadata of each specified pixel 305 to "embed" the watermark.

The first processor 125 can retrieve a reference data string from the first memory 120. The reference data string is a predetermined data string used to generate the watermark. For example, the reference data string can be an image, e.g., a logo. In another example, the reference data string can be a message, i.e., a plurality of words. The reference data string can be determined by, e.g., a manufacturer as a unique identifier for the second processor 135 to validate images. A central server provided by the manufacturer can transmit the reference data string to the first processor 125 and the second processor 135 over a wireless network, e.g., C-V2X, WiFi, etc.

The first processor 125 can retrieve a key data string from the first memory 120. The key data string is a predetermined set of alphanumeric characters. For example, the key data string can be a cryptographic key used in a conventional cryptographic program, e.g., Diffie-Hillman exchange, RSA encryption, AES, etc. The first processor 125 inputs the key data string to a permutation program to generate the watermark. The central server provided by the manufacturer can transmit the key data string to the first processor 125 and the second processor 135.

The first processor 125 can input the reference data string and the key data string to a permutation program to generate an encoded data string. The permutation program (sometimes called a permutation generator) can be a conventional cryptographic program, e.g., AES. That is, the permutation program rearranges the data in the reference data string in an order that is specified by the key data string. That is, the permutation program performs, for each portion of the reference data string, one or more of a substitution, a rearranging, or a mathematical operation according to block ciphers generated from the key data string. For example, if the permutation program is an Advanced Encryption Standard (AES) algorithm, the first processor 125 can identify a 16-byte portion of the reference data string, apply an "exclusive-or" function (i.e., an XOR function) between the 16-byte portion and a portion of the key data string to generate a first round string, and arrange first round string into a 4×4 grid. Then, the first processor 125 can perform one of (1) shift respective positions of bytes within the rows of the 4×4 grid, (2) substitute one of the bytes in the 4×4 grid with a known substitution byte, (3) shift respective positions of bytes within the columns of the 4×4 grid, or (4) scaling values of the bytes by predetermined integers. The shifting, scaling, and substitution algorithms are determined according to the specific permutation program. The first processor 125 can perform the permutation program for the entire reference data string to generate the encoded data string.

The first processor 125 can collect a set of data from one of the sensors 145. For example, the set of data can be a set of geo-coordinates of the vehicle 100 and a timestamp indicating a time at which the geo-coordinates were collected by the sensor 145. Using location and timestamps can allow the first processor 125 and the second processor 135 to assign watermarks with specific timestamps such that the second processor 135 can determine whether the first processor 125 and the second processor 135 process data at different times. That is, the timestamps indicate a time of collection of the geo-coordinates, and the second processor 135 can compare the timestamps of the data received by the first processor 125 to the timestamps of the data received by the second processor 135 to determine that the first processor 125 and the second processor 135 are using the same data collected at the same timestamp. Additionally or alternatively, the second processor 135 can identify a distance between a current position of the vehicle 100 and the set of geo-coordinates. When the distance is below a distance threshold, the second processor 135 can validate the digital image 300 from the first processor 125. The distance threshold can be a distance traveled by the vehicle 100 between collection of the set of geo-coordinates and provision of the set of geo-coordinates to the second processor 135. For example, if the time to transmit the set of geo-coordinates to the second processor is 50 milliseconds, the distance threshold can be a current speed of the vehicle 100 multiplied by the transmission time of 50 milliseconds.

The first processor 125 can apply the XOR function to the geo-coordinates and the timestamp data to generate an exclusive disjunction data string. The exclusive disjunction data string is the exclusive disjunction of the string of bits of the geo-coordinate data and the string of bits of the timestamp. The exclusive disjunction data string thus encodes both the specific geo-coordinate data and the timestamp.

The first processor 125 can generate the watermark with the reference data string, the key data string, and the set of data collected by the sensor 145. The first processor 125 inputs the key data string and the reference data string to the permutation program, as described above, to generate the encoded data string. The first processor 125 can apply the XOR function to the encoded data string and the exclusive disjunction data string, and the output of the XOR function is the watermark.

The first processor 125 can identify a plurality of pixels 305 in which to embed the watermark. Each pixel 305 in the image 300 can be assigned a number between 1 and the number N pixels 305 in the image 300. The first processor 125 can input a predetermined index key data string into a random number generator to generate a plurality of numbers between 1 and N. A "random number generator" is an algorithm that generates a sequence of numbers when seeded with an initial value, i.e., an index key data string. That is, the random number generator (RNG) is a deterministic algorithm that generates a specified sequence for each index key data string, also referred to as a "pseudo-random number generator." The RNG can be a conventional algorithm, e.g., a Lehmer generator, a Mersenne Twister, an Advanced Randomization System, Philox, etc. The first processor 125 can receive an index key data string for each image 300. The first processor 125 can receive the index key data string from the central server, as described above. The first processor 125 can generate a sequence of random numbers, each random number being an identification of a pixel 305 in which the watermark is embedded.

The first processor 125 can embed the watermark data string at the pixels 305 specified by the generated sequence of random numbers. The first processor 125 can write the bits of the watermark data string in metadata of the specified pixels 305. The first processor 125 can embed the entire watermark data string at each specified pixel 305, i.e., the first processor 125 can write all bits of the watermark data string in the metadata of each specified pixel 305. Alternatively, the first processor 125 can divide the watermark data string into portions of a specified size, e.g., 16-bit portions, 32-bit portions, etc., and write the bits of one of the segments in the metadata of one of the specified pixels 305. For example, if a 128-bit watermark data string can be divided into eight 16-bit portions, the first processor 125 can write the bits of a first 16-bit portion to a first specified pixel 305, the bits of a second 16-bit portion to a second specified pixel 305, the bits of a third 16-bit portion to a third specified pixel 305, etc., until all eight portions are written to pixels 305. In this example, the first processor 125 can identify a plurality of pixels 305 that is a multiple of eight, e.g., 24, 40, 64, etc., and embed successive portions in successive pixels 305 with successive indexes until one of the portions is embedded to each specified pixel 305.

The second processor 135 can receive the image 300 with the watermark embedded into a plurality of pixels 305. The second processor 135 can receive the reference data string, the key data string, and the index key data string from the server. The second processor 135 can receive the set of data collected by the sensor 145. That is, the second processor 135 can receive the same data as the first processor 125 to generate a validation watermark data string to validate the image 300.

The second processor 135 can generate the validation watermark string based on the reference data string and the key data string. As described above, the second processor 135 can be programmed with the same permutation program as the first processor 125, e.g. AES, RSA encryption, etc. The second processor 135 can input the reference data string and the key data string to the permutation program to generate an encoded data string, as described above. The second processor 135 can apply an XOR function to the set of data from the sensor 145 and the encoded data string to generate the validation watermark string. Because the second processor 135 uses the same data as the first processor 125, the validation watermark data string is the same as the watermark data string.

The second processor 135 can identify a plurality of pixels 305 of the image 300 to check for the validation watermark data string. The second processor 135 can be programmed with the same RNG as the first processor 125 described above. The second processor 135 can input the index key data string to the RNG to generate a plurality of numbers corresponding to pixels 305 of the image 300. The second processor 135 can generate the same plurality of numbers as the first processor 125. Alternatively, the second processor 135 can generate fewer numbers from the RNG than the plurality of numbers generated by the first processor 125. That is, the second processor 135 can validate the image 300 by comparing less than all of the pixels 305 in which the first processor 125 embedded the watermark data string to the validation watermark data string.

The second processor 135 can compare the pixels 305 assigned to the plurality of numbers generated by the RNG to the validation watermark data string. That is, the second processor 135 can compare a pixel 305 associated with a first number of the plurality of numbers to the validation watermark data string. If the pixel 305 includes the validation watermark data string, the second processor 135 can identify the pixel 305 as containing the watermark data string. The second processor 135 can compare the plurality of pixels 305 to the validation watermark data string. If the number of pixels 305 that include the validation watermark data string exceeds a threshold, the second processor 135 can validate the image 300. The threshold can be a predetermined number determined based on simulation testing with simulated images with a simulated watermark data string embedded. When the image 300 is transmitted to the second processor 135, one or more pixels 305 may be corrupted, i.e., one or more bits of the pixel may differ than the corresponding bits sent by the first processor 125. The simulation testing can determine an average number of pixels that are corrupted upon sending the image 300 to the first processor 125, and the threshold can be a number that is less than the difference between the total number of pixels 305 to which the first processor 125 embeds the watermark data string and the average number of corrupted pixels 305. For example, the second processor 135 can receive a predetermined data array A from the external server and a distorted data array Ad that is the predetermined data array A summed with a predetermined output r of an RNG. That is, Ad=A+r. The output r can be determined as an average number of corrupted bits transmitted by a simulated first processor 125 and a simulated second processor 125. The second processor 135 can determine a normalized correlation C between the data arrays A, Ad:

$$C = \frac{1}{n} \frac{\sum_{i=1}^{n} A_i \cdot Ad_i}{\sqrt{\Sigma_{i=1}^{n}(A_i)^2 \cdot \Sigma_{i=1}^{n}(Ad_i)^2}} \quad (1)$$

where $A_i$ is a bit of the predetermined data array A, $Ad_i$ is a bit of the distorted data array Ad, and n is a total number of bits in each data array A, Ad. The normalized correlation C is a value between 0 and 1, and the threshold described above can be the normalized correlation C multiplied by the number N of pixels 305 in the image 300.

Upon validating the image 300, the second processor 135 can transmit the image 300 to computer 105 to actuate the components 110 to operate the vehicle 100. As described above, the computer 105 may output signals to the components 110 to initiate various autonomous vehicle operations based on the images captured by the camera 140. For example, the computer 105 can instruct the components 110 to actuate at least one of a propulsion, a steering, or a brake to avoid an object detected in the image 300. In another example, the computer 105 can instruct the components 110 to actuate at least one of the propulsion, the steering, or the brake to transition from a current roadway lane to a different roadway lane.

Figure 4:
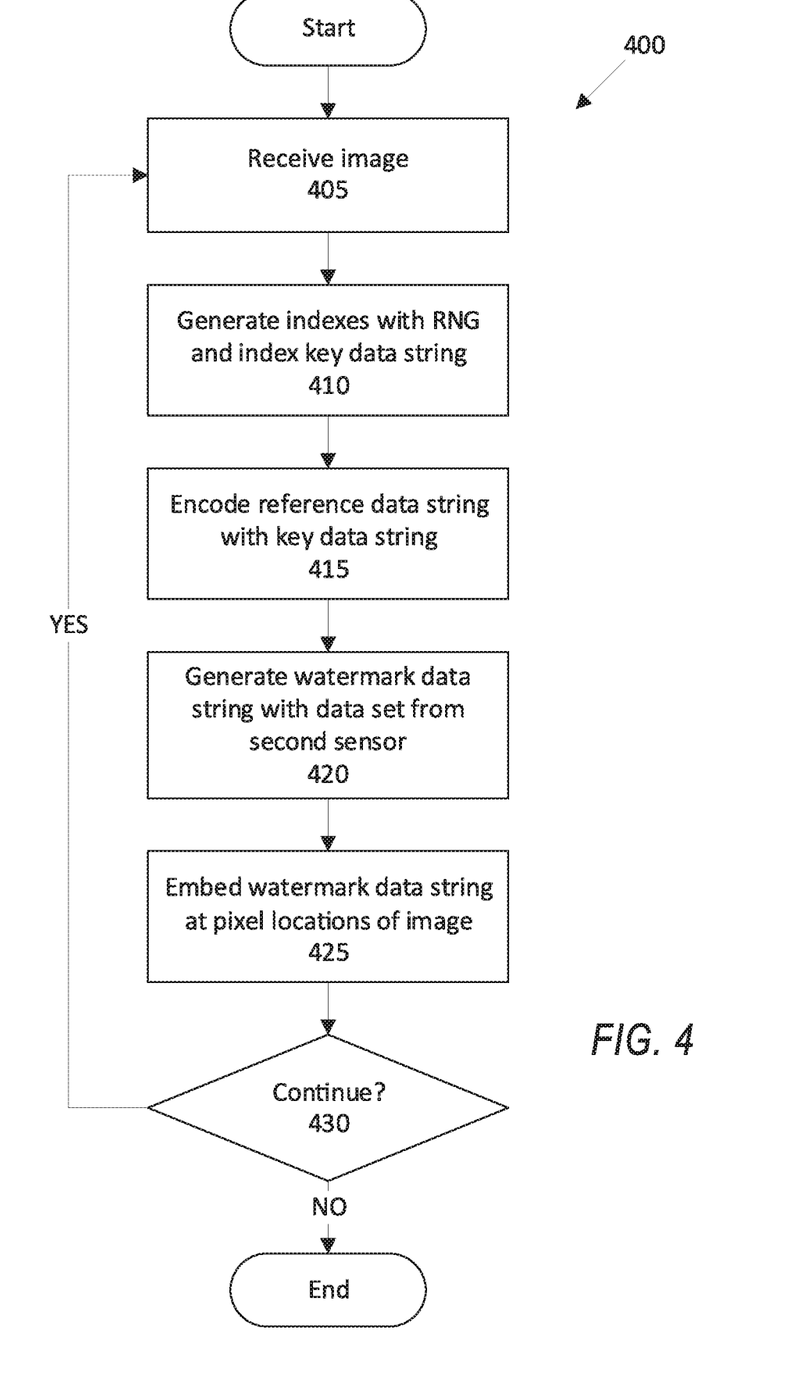
FIG. 4 is an example process for embedding a watermark to the example image.

FIG. 4 is a block diagram of an example process 400 for embedding a watermark into an image 300. The process 400 begins in a block 405, in which a first processor 125 receives an image 300 collected by a camera 140 mounted to a vehicle 100. The camera 140 can collect a plurality of images 300 from an environment around the vehicle 100.

Next, in a block 410, a first processor 125 inputs an index key data string to a random number generator (RNG) to generate a plurality of indexes. The first processor 125 can receive the index key data string from an external server. The first processor 125 can generate a plurality of indexes that are integers between 1 and a number N of pixels 305 in the image 300.

Next, in a block 415, the first processor 125 encodes a reference data string with a key data string. As described above, the first processor 125 inputs the reference data string and the key data string to a permutation program to generate the encoded data string. For example, the permutation generator can be, e.g., AES, RSA encryption, etc.

Next, in a block 420, the first processor 125 generates a watermark data string with the encoded data string and a set of data from a sensor 145. As described above, the sensor 145 can transmit a set of data (e.g., GPS location data) and a timestamp at which the data was collected to the first processor 125. The first processor 125 can apply an XOR function to the data and the time stamp to generate an exclusive disjunction data string. The first processor 125 can apply the XOR function to the encoded data string and the exclusive disjunction data string to generate the watermark data string.

Next, in a block 425, the first processor 125 embeds the watermark data string at specified pixel locations in the image 300. As described above, each index corresponds to one of the pixels 305 in the image 300, and the first processor 125 can embed the watermark data string at the pixels specified by the plurality of indexes. The first processor 125 can embed, i.e., write the bits of the watermark data string, to the metadata of the pixels 305.

Next, in a block 430, the first processor 125 determines whether to continue the process 400. For example, if the first processor 125 determines that there are no more images 300, the first processor 125 can determine not to continue the process 400. If the first processor 125 determines to continue, the process 400 returns to the block 405. Otherwise, the process 400 ends.

Figure 5:
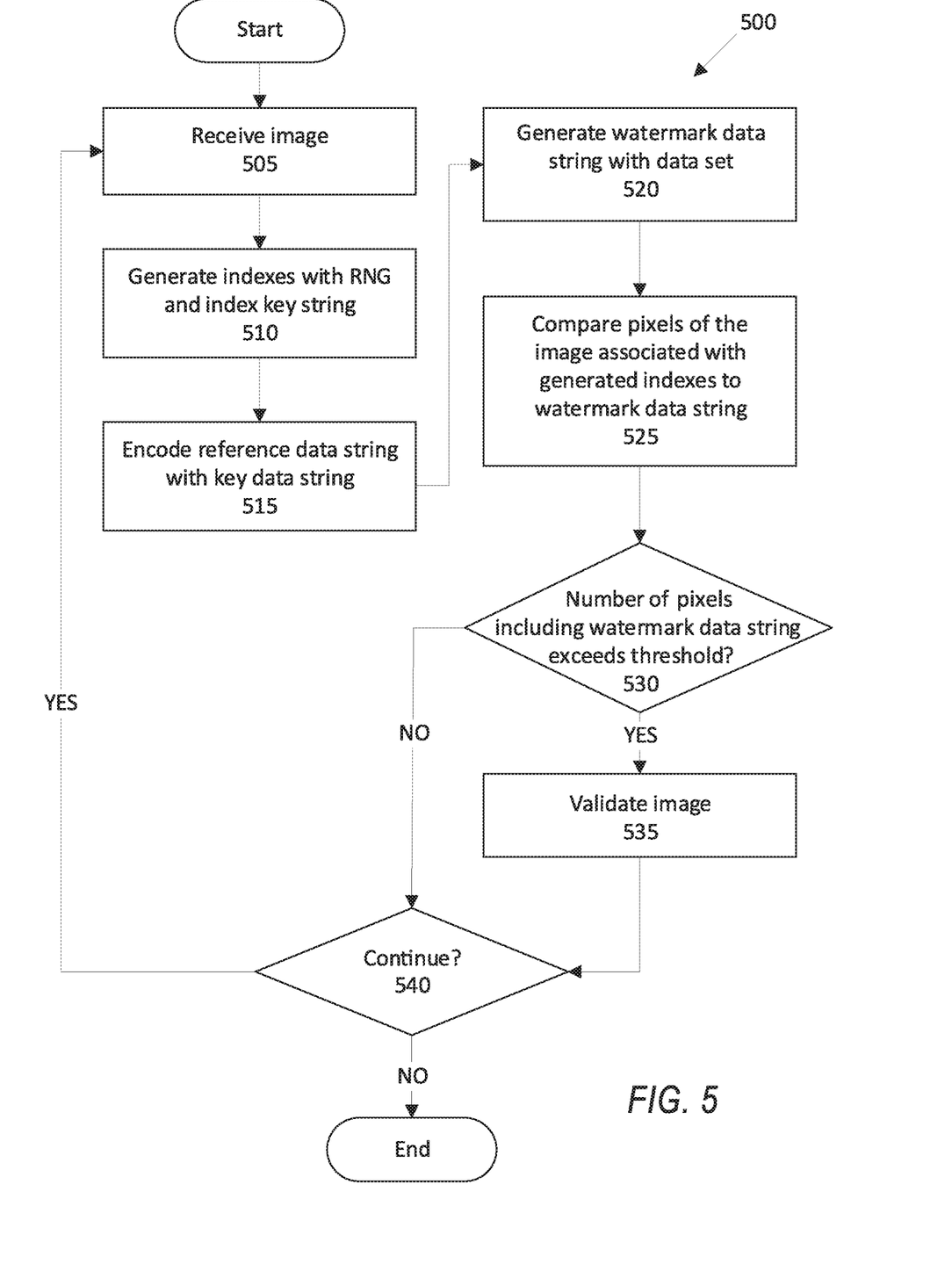
FIG. 5 is an example process for validating the example image.

FIG. 5 is a block diagram of an example process 500 for validating an image 300. The process 500 begins in a block 505, in which a second processor 135 receives an image 300 from a first processor 125. The image 300 has an embedded watermark data string, as described above. The first processor 125 can transmit the image 300 to the second processor 135 over a communications bus, as described above.

Next, in a block 510, the second processor 135 generates a plurality of indexes with an index key string. The second processor 135 can be programmed with the same RNG as the first processor 125. The second processor 135 can input the same index key string as the first processor 125 to the RNG to generate the plurality of indexes. Thus, the plurality of indexes generated by the second processor 135 either (1) include all of the indexes generated by the first processor 125 or (2) are a subset of the indexed generated by the first processor 125, depending on whether the second processor 135 generates greater or fewer indexes than the first processor 125.

Next, in a block 515, the second processor 135 encodes a reference data string with a key data string. As described above, the second processor 135 includes the same reference data string and the same key data string as the first processor 125. The second processor 135 can be programmed with the same permutation generator as the first processor 125. Thus, the second processor 135 generates the same encoded data string as the first processor 125 independently from the first processor 125.

Next, in a block 520, the second processor 135 generates a validation watermark data string. The second processor 135 receives the same set of data from the sensor 145 as the first processor 125 to generate the validation watermark data string. That is, the validation watermark data string generated by the second processor 135 is the same as the watermark data string generated by the first processor 125.

Next in a block 525, the second processor 135 compares pixels 305 of the image 300 associated with the plurality of indexes to the validation watermark data string. The second processor 135 can read the bits of the pixel 305 and, using a conventional bit-matching algorithm, determine whether the pixel 305 includes the bits of the validation watermark data string.

Next, in a block 530, the second processor 135 determines whether a number of pixels including the validation watermark data string exceeds a threshold. As described above, the transmission of the image 300 from the first processor 125 to the second processor 135 may alter one or more bits in one or more pixels 305 in the image 300. The second processor 135 can determine whether the number of pixels including the validation watermark exceeds a threshold based on the total number of embedded pixels 305 and an average number of pixels 305 with altered bits based on simulation testing. If the second processor 135 determines that the number of pixels including the validation watermark data string exceeds the threshold, the process 500 continues in a block 535. Otherwise, the process 500 continues in a block 540.

In the block 535, the second processor 135 validates the image 300. As described above, when the second processor "validates" the image, the second processor 135 authenticates the image 300 based on the presence of the expected watermark at the expected pixel locations. The second processor 135 can transmit the validated image 300 to the computer 105. The computer 105 can provide instructions to an components 110 according to data in the validated image 300 to actuate one or more components.

In the block 540, the second processor 135 determines whether to continue the process 500. For example, the second processor 135 can determine not to continue the process 500 upon receiving an instruction from the computer 105 that the vehicle 100 has stopped and is about to power off. If the second processor 135 determines to continue, the process 500 returns to the block 505.

Computing devices discussed herein include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The adjectives "first" and "second" are used as identifiers and are not intended to indicate significance or order.

What is claimed is:

1. A system, comprising a computer including a processor and a memory, wherein the memory stores instructions executable by the processor to:
   receive from a first sensor a digital image that includes a plurality of pixels;
   input a reference data string, a key data string, and a set of collected data from a second sensor into a permutation generator that outputs a watermark data string; and
   embed the watermark data string in the digital image at specified pixels in the plurality of pixels.

2. The system of claim 1, further comprising a second computer including a second processor and a second memory, the second memory storing instructions executable by the second processor to:
   receive the digital image from the first sensor;
   compare pixels in the plurality of pixels in the digital image to a validation watermark data string generated from the reference data string, the key data string, and the set of collected data received from the second sensor; and
   upon determining that a number of pixels that include the validation watermark data string exceeds a threshold, validate the digital image.

3. The system of claim 2, wherein the instructions stored by the memory further include instructions to actuate one or more components of a machine based on the validated digital image.

4. The system of claim 2, wherein the second memory further includes a same reference data string and a same key data string as the memory.

5. The system of claim 4, wherein the second memory further includes instructions to receive a same set of collected data from the second sensor and to generate the validation watermark data string by adjusting bits of the reference data string based on the key data string and the set of collected data.

6. The system of claim 1, wherein the set of collected data is a set of geo-coordinates and a timestamp of collection of the set of geo-coordinates and the memory further includes instructions to apply an exclusive-or (XOR) function to the set of geo-coordinates and the timestamp to generate an exclusive disjunction data string.

7. The system of claim 6, wherein the memory further includes instructions to encode the reference data string with the key data string to generate an encoded data string and to apply the XOR function to the exclusive disjunction data string and the encoded data string to generate the watermark data string.

8. The system of claim 6, further comprising a second computer including a second processor and a second memory, the second memory storing instructions executable by the second processor to compare the set of geo-coordinates to a position of a vehicle at the timestamp and to validate the digital image when the set of geo-coordinates is within a distance threshold of the position of the vehicle and a number of pixels that include the watermark data string exceeds a threshold.

9. The system of claim 1, wherein the memory further includes instructions to input the reference data string and the key data string to a cryptographic program to encode the reference data string and the key data string.

10. The system of claim 1, wherein the memory further includes instructions to collect a second digital image, to generate a second watermark data string based on a second set of collected data, and to embed the second watermark data string at a second plurality of pixels.

11. The system of claim 1, wherein the memory further includes instructions to collect a plurality of digital images and to generate a respective watermark data string for each digital image, each watermark data string being different than each other watermark data string.

12. The system of claim 1, wherein the memory further includes instructions to assign a first portion of the watermark data string to a first pixel of the digital image associated with a first index and to assign successive portions of the watermark data string to successive pixels of the digital image associated with successive indexes.

13. The system of claim 1, wherein the memory further includes instructions to identify the plurality of specified pixels with a random number generator seeded with a predetermined index key data string.

14. A method, comprising:
receiving, from a first sensor, a digital image that includes a plurality of pixels;
inputting a reference data string, a key data string, and a set of collected data from a second sensor into a permutation generator that outputs a watermark data string; and
embedding the watermark data string in the digital image at specified pixels in the plurality of pixels.

15. The method of claim 14, further comprising:
receiving the digital image from the first sensor;
comparing pixels in the plurality of pixels in the digital image to a validation watermark data string generated from the reference data string, the key data string, and the set of collected data received from the second sensor; and
upon determining that a number of pixels that include the validation watermark data string exceeds a threshold, validating the digital image.

16. The method of claim 14, wherein the set of collected data is a set of geo-coordinates and a timestamp of collection of the set of geo-coordinates and the method further comprises applying an exclusive-or (XOR) function to the set of geo-coordinates and the timestamp to generate an exclusive disjunction data string.

17. The method of claim 16, further comprising encoding the reference data string with the key data string to generate an encoded data string and applying the XOR function to the exclusive disjunction data string and the encoded data string to generate the watermark data string.

18. The method of claim 16, further comprising comparing the set of geo-coordinates to a position of a vehicle at the timestamp and validating the digital image when the set of geo-coordinates is within a distance threshold of the position of the vehicle and a number of pixels that include the watermark data string exceeds a threshold.

19. The method of claim 14, further comprising inputting the reference data string and the key data string to a cryptographic program to encode the reference data string and the key data string.

20. The method of claim 14, further comprising identifying the plurality of specified pixels with a random number generator seeded with a predetermined index key data string.

* * * * *